Mar. 20, 1923.
F. W. SEECK
STEERING GEAR
Filed Nov. 6, 1920    2 sheets-sheet 1
1,449,351
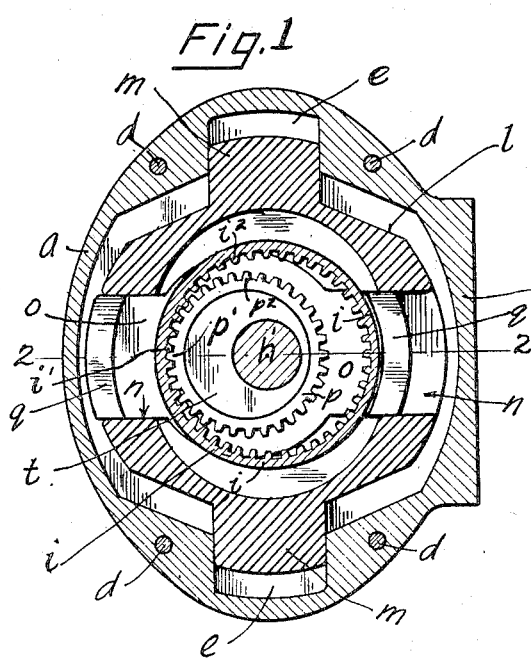
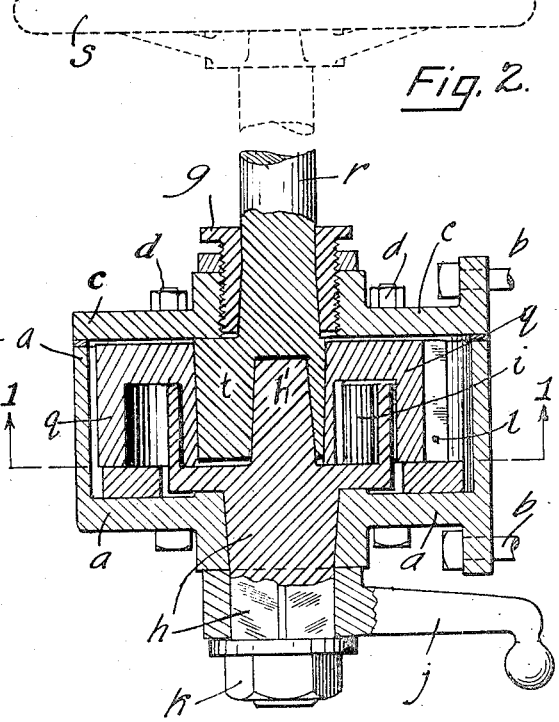
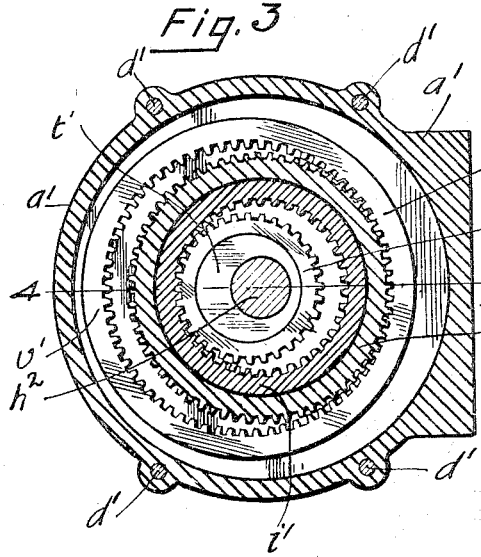
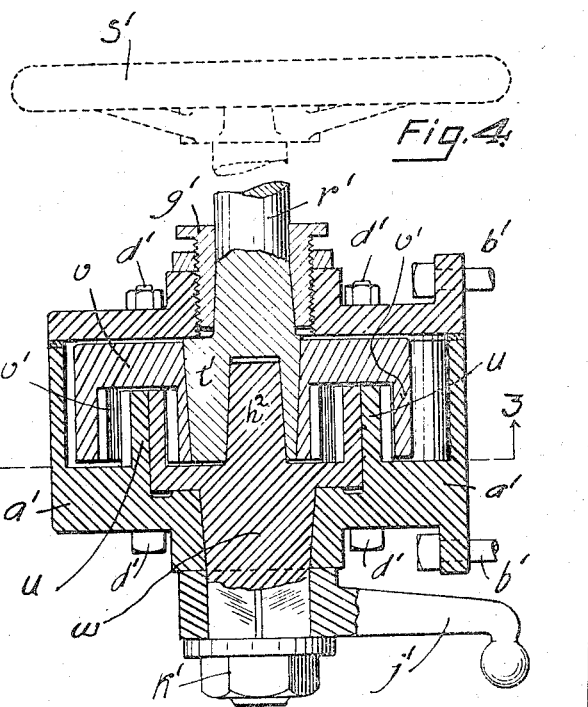
FERDINAND W. SEECK.
INVENTOR,
BY T. J. Geisler
ATTY.

Mar. 20, 1923.
F. W. SEECK
STEERING GEAR
Filed Nov. 6, 1920    2 sheets-sheet 2
1,449,351
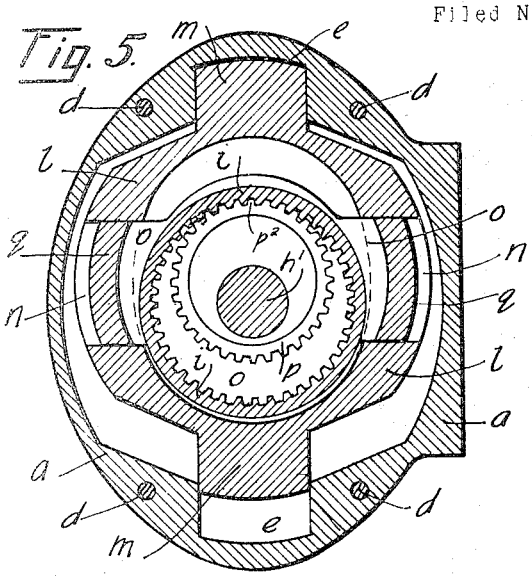
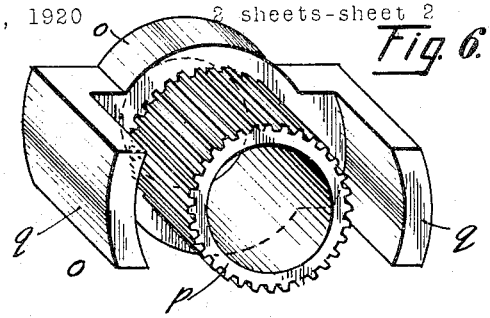
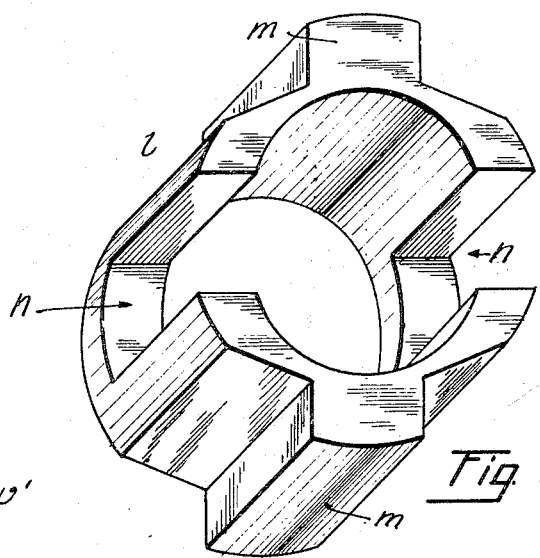
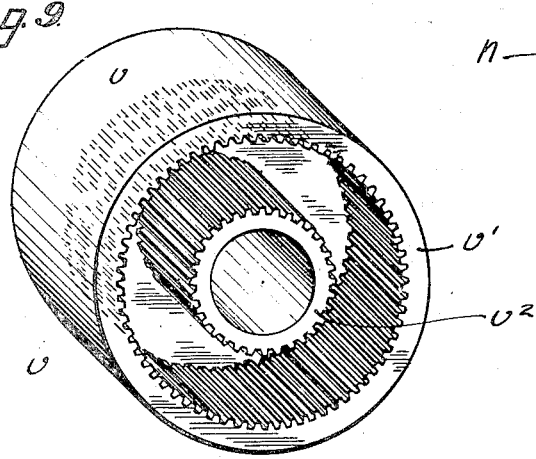
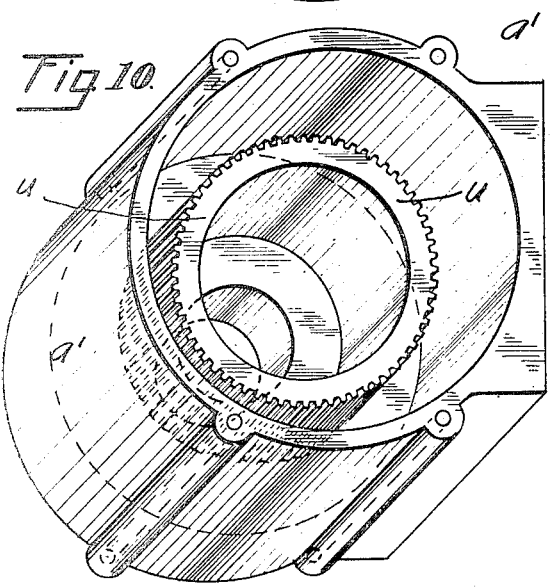
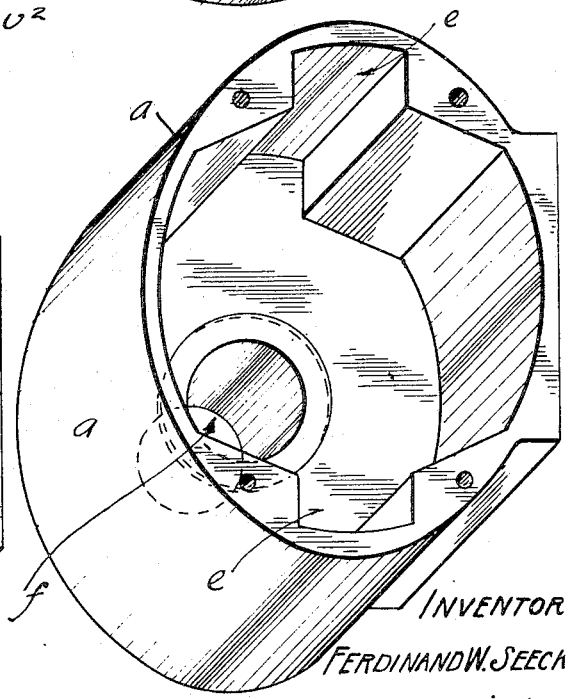
INVENTOR
FERDINAND W. SEECK
By J. G. Geisler
ATTY.

Patented Mar. 20, 1923.

1,449,351

UNITED STATES PATENT OFFICE.

FERDINAND W. SEECK, OF LEBANON, OREGON.

STEERING GEAR.

Application filed November 6, 1920. Serial No. 422,219.

*To all whom it may concern:*

Be it known that I, FERDINAND W. SEECK, a citizen of the United States, and a resident of the city of Lebanon, county of Linn, and State of Oregon, have invented a certain new and useful Improvement in Steering Gears, of which the following is a specification.

This invention relates to the steering gear of vehicles, and is particularly designed for automobiles.

The object of my invention is to provide a steering gear, of the hand-wheel type, which includes in the combination of its parts certain devices, not interfering with the usual manipulation of the steering-wheel, nor rendering it appreciably more difficult to operate, but resisting effectively any reverse action of the parts; that is to say resisting any appreciable movement of the steering-wheel by the knuckle of the steering post, due to a sudden side wrench of the wheels, as is frequently caused, in the present type of steering-gear, by inequalities in the road surface.

It is furthermore the object of my invention to provide a differential gear effect, so as to obtain a leverage action rendering the steering operation easier.

I attain my object in the combination comprising a steering-post, a spindle in axial alinement with the steering-post, the spindle carrying a steering-knuckle, and being provided with a fixed ring concentric with its axis of rotation, the ring having internal teeth, the steering-post carrying an eccentric hub bearing in said ring of the spindle, and differential motion transmitting elements connecting said eccentric hub with the ring of the spindle, and operating to transmit rotary motion to the spindle thru the linear displacement of the motion transmitting elements, relative to the circular motion of said eccentric hub.

Details of devices whereby my invention can be carried into practice are shown in the accompanying drawings, in which, Fig. 1 is a horizontal section of my device, on the line 1—1 of Fig. 2 looking in the direction pointed by the arrow heads;

Fig. 2 is a vertical section of my device, taken on the line 2—2 of Fig. 1;

Fig. 3 is a view similar to Fig. 1, but showing an alternate construction of my device; this view being taken on the line 3—3 of Fig. 4 looking in the direction pointed by the arrow heads;

Fig. 4 is a vertical section of my alternate device, taken on the line 4—4 of Fig. 3;

Fig. 5 is a horizontal section of my device shown in Figs. 1 and 2, and is identical with Fig. 1, showing the movable parts in an advanced position;

Fig. 6 is a perspective detail of the inner cross-head member of my device;

Fig. 7 is a perspective detail of the outer cross-head member of my device;

Fig. 8 is a perspective view of the housing containing the parts shown in Figs. 6 and 7;

Fig. 9 is a perspective view of the members of my alternate device; and

Fig. 10 is a perspective view of the housing of my device when constructed as shown in Figs. 3 and 4.

I will first describe the construction and operation of my device as shown in Figs. 1 and 2, and the details shown in Figs. 5 to 8 inclusive.

A housing $a$ is adapted to be fastened by bolts $b$, to a rigid member of the vehicle, not shown.

The housing is provided with a cover $c$, adapted to be secured in place by the cap-screws $d$. The inner faces of the walls of the housing are made with opposite vertical recesses or guideways $e$, and the housing has a journal-box $f$, located centrally in its base, (see Fig. 8). The cover $c$ is made with a cylindrical tapped opening located in axial alinement with the journal-box $f$ of the housing; and $g$ is a packing gland threaded into said opening. A vertical spindle $h$ has on its upper end a fixed annular-ring $i$, having internal teeth and a centrally located upwardly projecting stub-shaft $h'$. Said spindle $h$ is journalled in the journal-box $f$ of the housing, and has a downwardly projecting end on which is fixed a steering-knuckle $j$, held in place by a nut $k$.

An outer cross-head $l$—for convenience termed primary cross-head—shown by itself in Fig. 7, is made with an integral ring having opposite vertical lateral ribs $m$, adapted to be slidably seated in the recesses or guide-ways $e$ of the housing $a$; the parts being adapted to permit the primary cross-head $l$ a limited linear movement as will be apparent by comparing Figs. 1 and 5. The primary cross-head $l$ is further provided with opposite vertical slots or guide-ways $n$.

An inner, or companion cross-head $o$, has a centrally located fixed ring $p$ provided with external teeth and further has lateral arms $q$ adapted to slide in the guide-ways $n$ of the primary cross-head $l$. See detail of companion cross-head shown in Fig. 6; and see also Figs. 1 and 5.

The external teeth of the ring $p$ of the companion cross-head engage with the internal teeth of the ring $i$ of the spindle $h$.

As now apparent the primary cross-head $l$, and companion cross-head $o$ have merely relative linear movements along paths at right angles to each other.

The steering column $r$ is provided with a hand-wheel $s$, and on its lower end is made with a socket adapted to receive the stub shaft $h'$ of the spindle $h$, and thus holding the steering column and spindle in true and constant axial alinement.

The lower end of the steering column is further made with an eccentric hub $t$, adapted to rotate in the annular ring of the companion cross-head $o$. The primary and companion cross-head $l$, and $o$ are in effect motion transmitting elements having linear motion, and connect the eccentric hub of the steering column with the ring of the spindle, rotating the latter relatively to the circular motion given said eccentric hub.

The general operation of my device, when constructed as described, is as follows:

The turning of the steering wheel $s$ will transmit a corresponding rotary movement to the eccentric-hub $t$ and cause a relative displacement of the ring $p$ of the companion cross-head $o$, and due to the engagement of the external cogs of the ring $p$ with the internal cogs of the ring $i$ of the spindle $h$ the latter is rotated, and therewith the steering knuckle $j$. In other words, the relative movement imparted to the ring $p$ of the companion cross-head $o$ by the turning of the steering-wheel drags the spindle $h$ around with it; and the rotation of the spindle is accomplished with little effort. But a reverse effect—that is to say the rotation of the steering wheel by the rotation of knuckle $j$, due to a sudden twist of the steering wheels, is effectively resisted, because since the ring $p$ of the companion cross-head $o$ is a fixed part of the latter and hence cannot rotate, it resists the rotation of the spindle, and the force applied by the ring $i$ of the spindle, in any inadvertent rotation of the latter, would be directed along the longest radius of the eccentric hub $t$ with reference to the axis of rotation of the steering-wheel; and therefore could have no appreciable turning effect on the latter; of course there will be some play in the parts, but the motion so permitted will be negligible.

Furthermore the action of the cooperating parts will be similar to a differential gear action. Let it be assumed that the ring $i$ of the spindle $h$ has 60 teeth, and the ring $p$ of the companion cross-head has 40 teeth.

Referring to Fig. 1, it will be observed that the tooth $p'$ of the ring $p$ of the companion cross-head is bearing on the cog $i'$ of the ring $i$ of the spindle $h$.

Assuming the steering-wheel to be turned through an arc of 90°, the ring $p$ will relatively move so that its cog $p^2$ will engage the tooth $i^2$ of the ring $i$. It will be observed that from cog $p'$ to cog $p^2$ is one quarter of the circumference of the gear $p$, which distance will include the eight spaces between nine teeth.

The distance between said cogs $i'$ and $i^2$ is also eight teeth. But since there are fifteen cogs in one quarter of the ring $i$, it is obvious that the ring $i$ must be rotated a small degree in order to bring the cog $i^2$ to the position shown in Fig. 5. This slight movement will be a distance equal to the space of five cogs, and means that a quarter revolution of the steering-wheel will rotate the steering-knuckle one-twelfth of a revolution, which is the ratio of five cogs or teeth to the total,—sixty cogs or teeth provided on the ring $i$ of the spindle $h$.

Hence, as obvious, if the steering-knuckle is to be moved one sixth of a revolution it will be necessary to turn the steering-wheel through one-half of a revolution.

Of course the ratio of the cogs or teeth of the meshing rings can be rearranged so as to produce any other differential movement desired.

In Figs. 3, 4, 9 and 10, I have shown another construction of my device, operating however, identically with the one previously described.

In the latter construction the housing $a'$ is made with an integral, centrally located ring $u$, provided with exterior peripheral teeth or cogs. See Fig. 10. A hollow cylindrical member $v$, open at one end, is provided with internal cogs $v'$ adapted to mesh with said cogs of the central ring $u$ of the housing $a$. And the cylindrical member $v$ is further provided with an integral central ring $v^2$ having external peripheral cogs.

The spindle $w$ is the equivalent of the spindle $h$ in the first described construction. It is provided with an integral ring $i''$ having teeth on its inner peripheral face adapted to mesh with the external teeth provided on the central ring $v^2$ of the cylindrical member $v$. The steering-post $r'$ is the equivalent of the steering-post $r$. It is provided with a hand-wheel $s'$ and a socket in its base for mounting on the stud-shaft $h^2$ of the spindle $m$. And the steering-post $r'$ is also provided with an eccentric hub $t'$ adapted to rotate in the ring $r^2$ of the cylindrical member $r$.

The cooperation of the parts and the effect produced is substantially the same as that of the devices first-above described; and the parts $b'$, $d'$, $j'$, and $k'$ are the same as like parts bearing similar reference characters, but without exponents, in my first-above described device.

While I have described my motion transmitting means as applied to a steering gear, it is obvious my invention has other uses.

I claim:

1. A differential motion transmitting means comprising, a housing, means for holding housing in place, a power transmitting shaft means having bearings in said housing, a rotatably propelled shaft which is held in axial alinement by and bears in said housing, an internal gear and a stub shaft fixedly secured and concentric with the axis of rotation of said propelled shaft, said stub shaft seated in and alined with said power transmitting shaft means, an ecentric element operated by the power transmitting shaft means, an external gear smaller in diameter than said internal gear and meshing with said internal gear, said external gear being gyrated by said eccentric element about said stub shaft, but held from rotation about its own axis by primary and companion motion transmitting members having lineal motion in said housing on paths normal to each other, one of said members sliding in the other and carrying said external gear.

2. A differential motion transmitting means comprising, a housing, means for holding housing in place, a power transmitting shaft means having bearings in said housing, a rotatably propelled shaft which is held in axial alinement by and bears in said housing, an internal gear and a stub shaft fixedly secured and concentric with the axis of rotation of said propelled shaft, said stub shaft seated in and alined with said power transmitting shaft means, an eccentric element operated by the power transmitting shaft means, an external gear smaller in diameter than said internal gear and meshing with said internal gear, said external gear being gyrated by said eccentric element about said stub shaft, but held from rotation about its own axis by primary and companion motion transmitting members having lineal motion in said housing on paths normal to each other, one of said members carrying said external gear.

FERDINAND W. SEECK.